United States Patent [19]

Penner

[11] Patent Number: 5,341,629
[45] Date of Patent: Aug. 30, 1994

[54] HINGED-BLADE ROADSIDE MOWER

[76] Inventor: Erich R. Penner, Rural Route #1 S29 C5, Castlegar, B. C., Canada

[21] Appl. No.: 16,165
[22] Filed: Feb. 9, 1993
[51] Int. Cl.5 .............................................. A01D 34/86
[52] U.S. Cl. .................... 56/15.2; 56/DIG. 3; 56/DIG. 9; 56/DIG. 10
[58] Field of Search ............ 56/15.2, 15.1, 15.4, 56/15.5, 15.6, DIG. 3, DIG. 9, DIG. 10, DIG. 14

[56] References Cited

U.S. PATENT DOCUMENTS

| | | | |
|---|---|---|---|
| 3,061,996 | 11/1962 | Ripps | 56/10.7 |
| 3,087,296 | 4/1963 | Cowles | 56/295 |
| 3,116,583 | 1/1964 | Mason | 56/6 |
| 3,136,106 | 6/1964 | Joslin | 56/25.4 |
| 3,319,407 | 5/1967 | Jordan et al. | 56/15.2 |
| 3,418,790 | 12/1968 | Whitfield et al. | 56/6 |
| 3,559,385 | 2/1971 | Eaton | 56/10.7 |
| 3,624,698 | 11/1971 | Storm | 56/10.7 |
| 3,653,193 | 4/1972 | Coughran, Jr. | 56/10.7 |
| 3,852,945 | 12/1974 | Berry et al. | 56/12.7 |
| 3,949,539 | 4/1976 | Cartner | 56/10.7 |
| 4,121,777 | 10/1978 | Kolstad et al. | 241/58 |
| 4,241,565 | 12/1980 | Parsons, Jr. | 56/10.7 |
| 4,502,269 | 3/1985 | Cartner | 56/15.5 |
| 4,509,315 | 4/1985 | Giguere | 56/10.7 |
| 4,707,971 | 11/1987 | Forpahl et al. | 56/15.2 X |
| 4,887,417 | 12/1989 | Parsons, Jr. | 56/15.5 |
| 5,031,389 | 7/1991 | Yawn et al. | 56/DIG. 10 X |
| 5,133,174 | 7/1992 | Parsons, Jr. | 56/DIG. 10 X |
| 5,209,049 | 5/1993 | Heard | 56/15.5 |

Primary Examiner—Terry Lee Melius
Attorney, Agent, or Firm—Wells, St. John, Roberts, Gregory & Matkin

[57] ABSTRACT

A mobile mower apparatus comprises a mower boom which is pivotally connected to a mobile vehicle for lateral extension therefrom. A mower frame is suspended from the boom. The mower frame has two frame sections which are connected to each other to allow the frame sections to pivot relative to each other about a generally horizontal pivot axis. A mower blade is mounted on each of the frame sections for relative pivotal motion corresponding to the motion of the frame sections. A hydraulic cylinder is connected to the mower frame to allow a human operator to control the relative angular positions of the first and second frame sections while mowing. The mower blades defining cutting lines which approximately intersect the pivot axis.

35 Claims, 4 Drawing Sheets

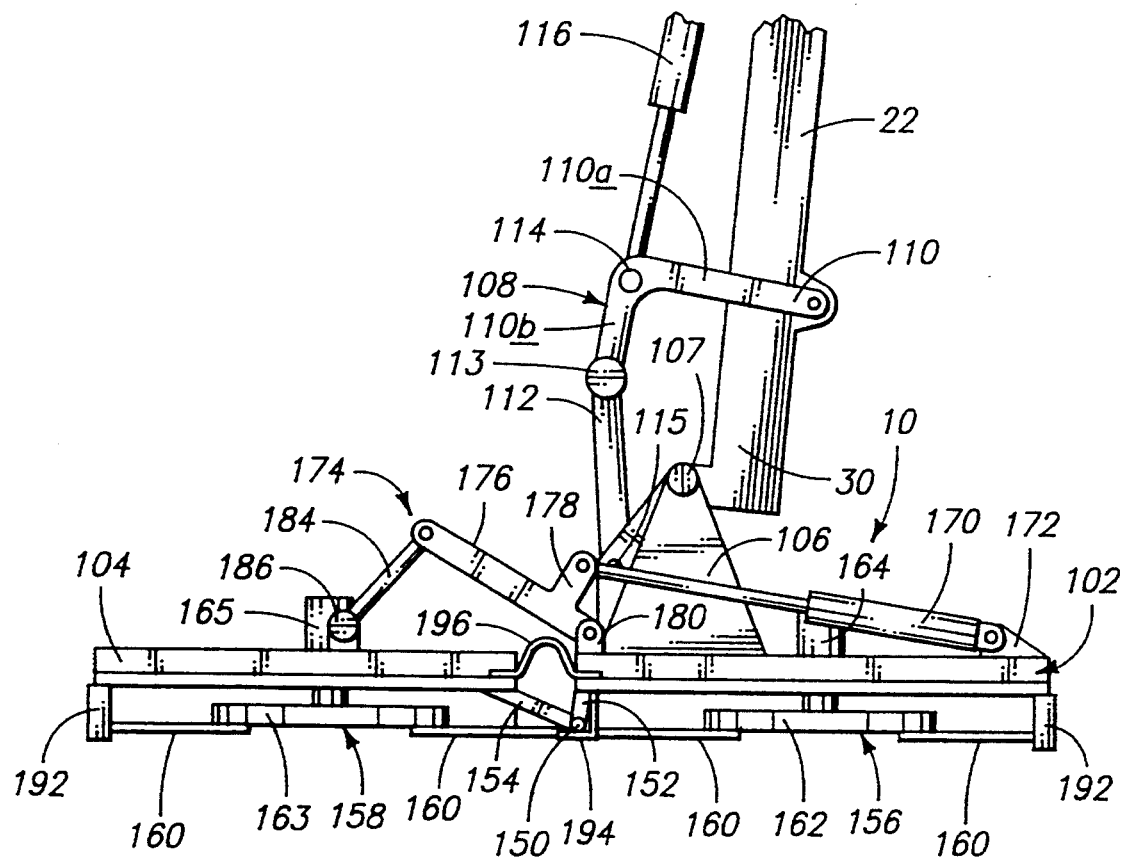
_FIG. 2_
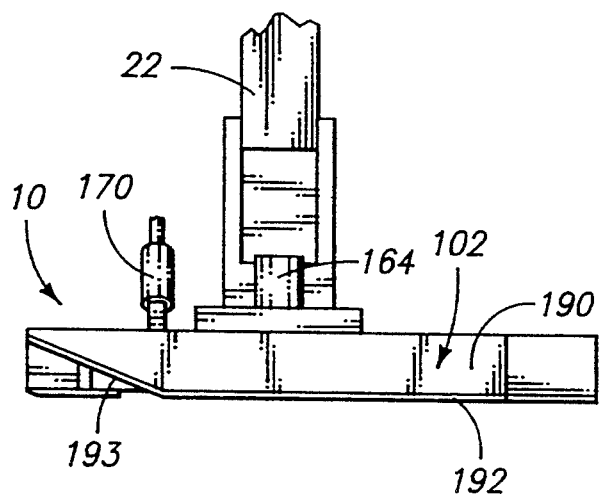
_FIG. 3_

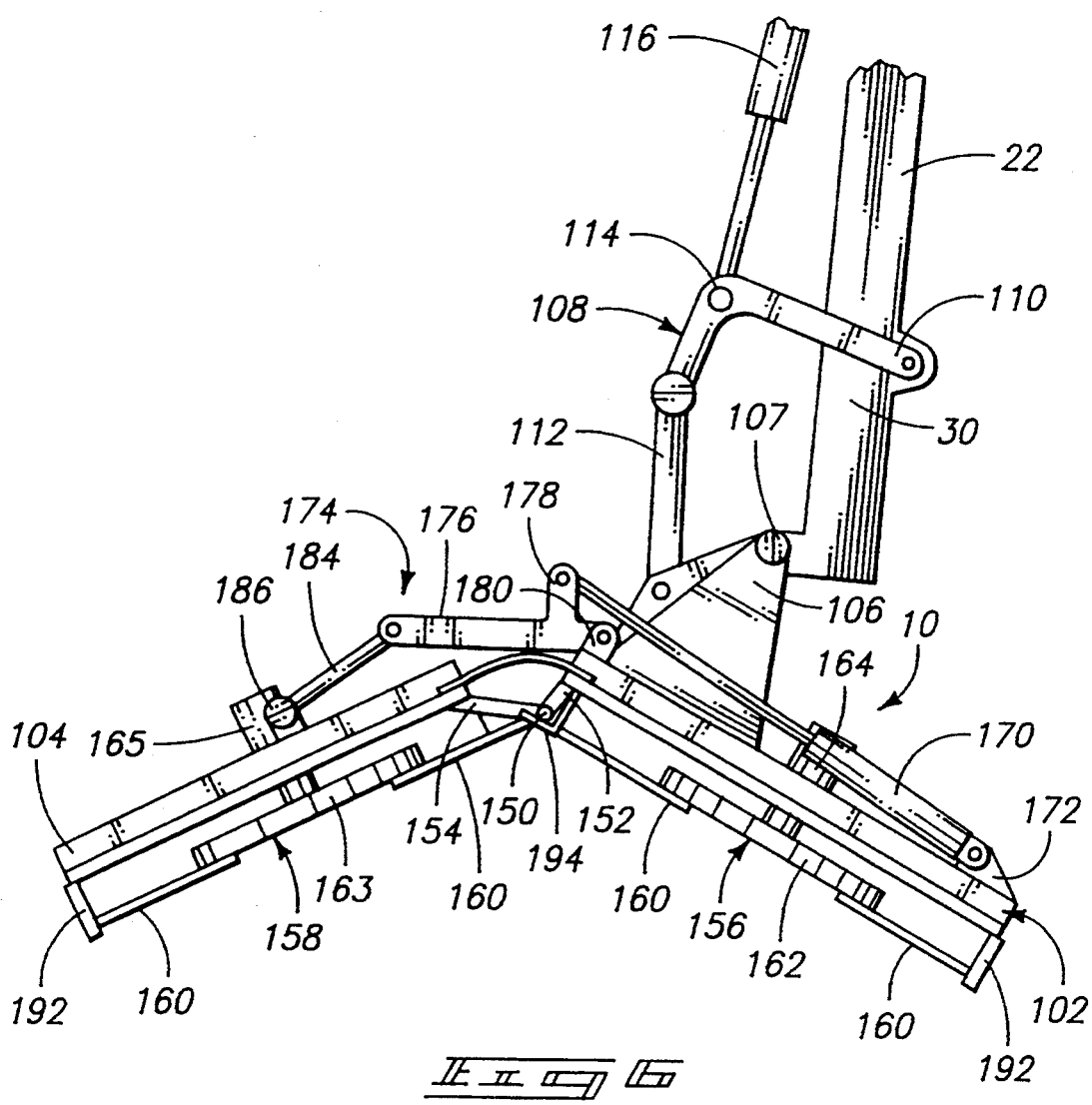

HINGED-BLADE ROADSIDE MOWER

TECHNICAL FIELD

This invention relates to articulated boom mowers for mowing roadsides.

BACKGROUND OF THE INVENTION

Large scale roadside mowers are commonly attached to tractors or other suitable vehicles. Heavy roadside mowers are sometimes mounted directly behind tractors. Such mowers are either suspended from the vehicle or have integral wheels which support the mower above the ground from beneath. Mowers such as these are appropriate when it is possible to drive the tractor over the ground which is to be mowed. In many instances, however, the ground to be mowed cannot be negotiated, particularly by wheeled vehicles.

Roadsides or highway medians are typically difficult for wheeled vehicles to travel over, for a variety of reasons. For instance, roadsides are often steep or irregular. In addition, access by wheeled vehicles is frequently prevented by guardrails or other structures alongside roads. Furthermore, roadsides are often strewn with rocks, holes, or other obstacles, precluding access by wheeled vehicles or by mowers supported from beneath by wheels or runners.

Because of the inaccessibility of roadsides to conventional mowers, mowing devices have been attached to booms which extend laterally from a mobile vehicle such as a tractor or road grader. Such booms suspend the mower above the ground to be mowed. The booms are usually articulated to allow selective placement of the mower. In addition, angular orientation of boom-mounted mowers is adjustable to conform to varying roadside slopes.

Varying the angular orientation of a boom-mounted mower allows convenient mowing of sloped roadsides. However, mowing such sloped roadsides consumes a great deal of time and effort. This is particularly true in instances where the roadside has an irregular contour, such as a ditch. At least two mower passes are usually required to mow a ditch having two oppositely sloping sides. During the first pass, the mower is inclined parallel with one sloped side of the ditch. During the next pass, the mower is inclined parallel with the remaining sloped side.

Ditches are not the only form of irregular contour found alongside roadways. For instance, a highway shoulder may be humped. It may extend horizontally away from the road for a short distance before sloping upward or downward. In such cases, multiple passes are required to adequately mow the different roadside slopes. In addition, a roadside contour rarely remains constant, thus complicating the mowing process.

The invention described below simplifies the task of mowing irregular roadsides, and is particularly advantageous for mowing ditches. In most cases the invention eliminates the need for multiple passes. The invention allows mowing time and expenses to be significantly reduced, such as by nearly one half, while achieving acceptable or improved results.

BRIEF DESCRIPTION OF THE DRAWINGS

A preferred embodiment of the invention is described below with reference to the accompanying drawings which are briefly described below.

FIG. 2 is an enlarged partial front view of a dual-blade mower assembly as shown in FIG. 1. The mower assembly portion is shown adjusted to place the frame sections into a parallel position.

FIG. 3 is an enlarged side view of the mower assembly of FIG. 2.

FIG. 6 is an enlarged partial front view similar to FIG. 2. The frame sections are shown in a further or third relative angular position.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 1:
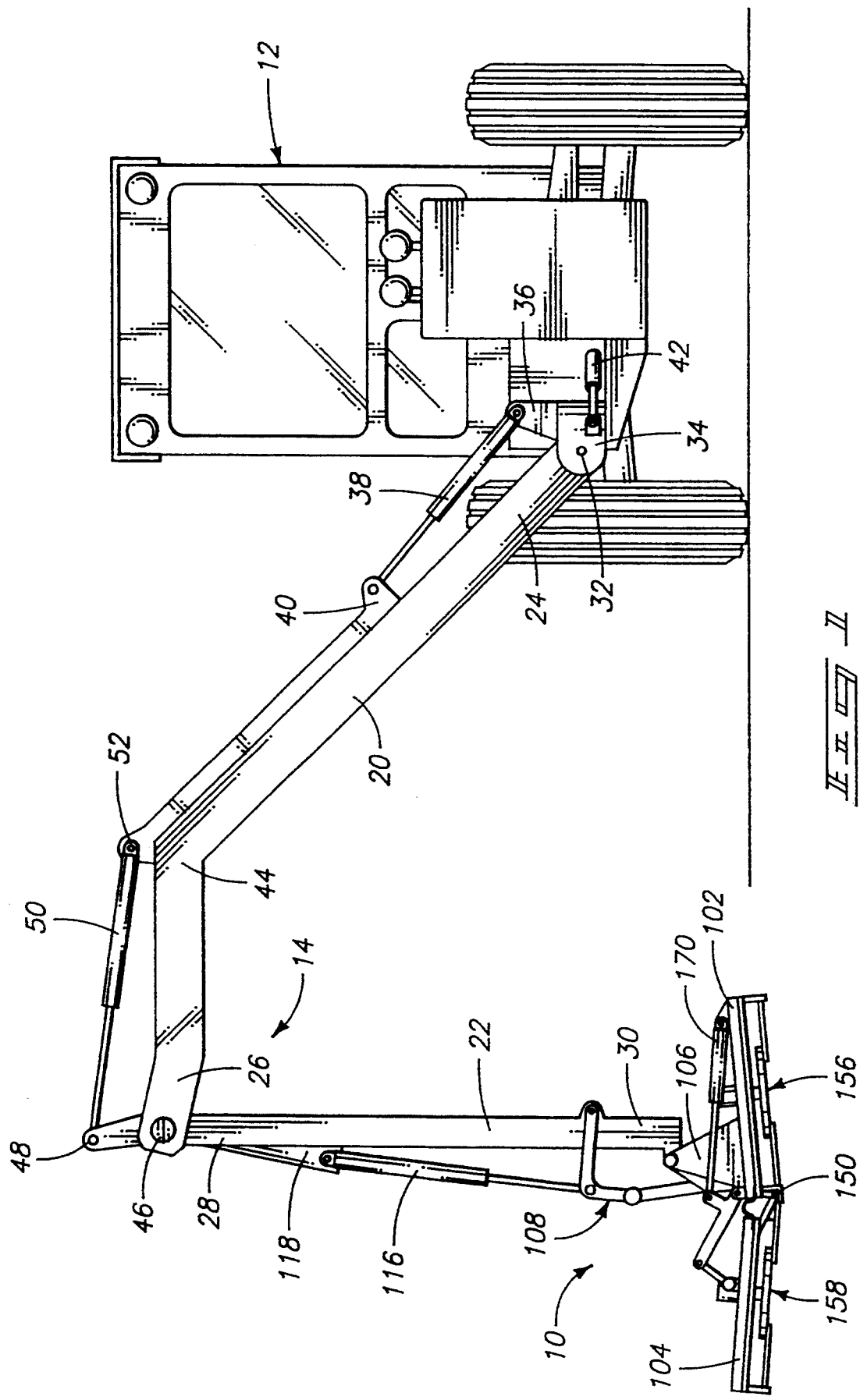
FIG. 1 is a front view of a mobile mower apparatus in accordance with a preferred embodiment of the invention.

FIG. 1 shows a dual-blade mower assembly 10 in accordance with a preferred embodiment of the invention. Mower assembly 10 is mounted to extend laterally from a mobile vehicle such as a tractor or grader 12.

Tractor 12 includes an articulated mower boom 14. Mower boom 14 is pivotally connected to tractor 12 and extends laterally therefrom in a direction which is adjustable. It swings about a center of travel generally perpendicular to the tractor's centerline and direction of travel. Mower assembly 10 is suspended above the ground, from mower boom 14, to travel along a desired mowing path without need for contact with or support from the ground. Remotely-controlled positioning controls allow an operator within the tractor to controllably position the mower assembly. This allows the mower assembly to be properly positioned to maintain a desired roadside mowing path, while allowing the tractor to follow an approximately parallel path upon an adjoining road.

As shown, mower boom 14 includes first and second articulated boom arms or members 20 and 22. First boom member 20 has an inner end 24 and an outer end 26. Inner end 24 of first boom member 20 is supported upon the front end of tractor 12 in a manner allowing for pivotal motion about both vertical and horizontal axes, as detailed below. Second boom member 22 has an upper end 28 which is connected to the outer end of first boom member 20. The second boom member also has a lower end 30, which is connected to mower assembly 10.

First boom member 20 is connected in an articulated manner at a base joint connection 32. Joint connection 32 is positioned at inner end 24 of first boom member 20 to allow outer end 26 of boom member 20 to pivot up and down about a first boom inner end pivot axis located near inner end 24. A relatively short base member 34 extends toward tractor 12 from joint connection 32. Base member 34 is mounted to the front of tractor 12 for pivotal motion about a vertical swing axis. This allows boom 14 to swing over a wide swing range of motion. More specifically the boom can be swung over a range of lateral positions and into a forward transport position used when the mower is not moving and merely being transported.

Base member 34 includes a base strut 36 which extends upward from remaining portions of the base member. A remotely-controlled boom height actuator 38, preferably a single-acting hydraulic cylinder, is connected between base strut 36 and a boom actuator connection lug 40. Actuator lug 40 is advantageously located at an intermediate position along first boom member 20. Hydraulic cylinder 38 is responsive to an operator control (not shown) in the cab of tractor 12 to allow a human operator to controllably pivot first boom member 20, thus raising and lowering the outer end of first boom member 20. The single action of cylinder 38 allows the mower assembly to yield upwardly upon hitting an obstruction.

The base member and attached boom are swung by a remotely-controlled boom swing actuator 42. Boom swing actuator 42 is also preferably a double-acting hydraulic cylinder which is connected between tractor 12 and base member 34 to control the swing orientation of base member 34. Boom actuator 42 is also responsive to an operator control (not shown) in the cab of tractor 12 to allow the operator to control the swing orientation. The ability to move mower boom 14 into a forward-extending position is needed for transporting the tractor. There is normally no need to adjust the swing orientation of boom 14 during mowing. However, a relief valve (not shown) is preferably included in the hydraulic circuit which operates actuator 42. The relief valve allows the boom to yield rearwardly upon hitting an obstruction, thus minimizing damage to the mower assembly. Boom actuator 42 is readjusted after such an occurrence to restore the desired swing orientation to the boom.

While mowing, first boom member 20 extends laterally from tractor 12 in a generally upwardly inclined position to its upper end 26. In the preferred embodiment first boom member 20 is bent to form an elbow 44 at an intermediate position along its length to provide better clearance near the tractor while keeping the overall height within a desired range. Boom member 20 extends generally horizontally from elbow 44 to outer end 26. The incline of boom member 20 is adjustable by control of hydraulic cylinder 38 to adjust for varying elevations of surfaces to be mowed by mower assembly 10.

Upper end 28 of second boom member 22 is pivotally connected to outer end 26 of first boom member 20 at a connecting joint 46. Connecting joint 46 allows boom members 20 and 22 to pivot relative to each other about a generally horizontal axis. Upper end 28 of second boom member 22 extends upward beyond connecting joint 46 to provide an actuator extension 48. A remotely-controlled boom actuator 50, preferably a double-acting hydraulic cylinder, is operably connected between first and second boom members 20 and 22 to controllably pivot the first and second boom members relative to each other. Hydraulic cylinder 50 is connected between a second boom actuator extension 48 and a second boom actuator lug 52 rigidly connected to first boom member 20, preferably at or near elbow 44. Hydraulic cylinder 50 is responsive to an operator control (not shown) in the cab of tractor 12. Cylinder 50 allows an operator to controllably pivot second boom member 22 relative to the outer or distal end of the first boom. This provides control of the lateral extension of mower boom 14 and the lateral position of mower assembly 10.

Second boom member 22 extends generally downward from first boom member 20 to mower assembly 10. By using the operator-controlled hydraulic cylinders described above, an operator can continuously adjust the placement of mower assembly 10 relative to tractor 12 during mowing. The mechanism described above allows control over both lateral and vertical position. In addition, as described below, means are provided for remotely controlling the overall tilt orientation and relative angular orientation of the two mower assembly parts 102 and 104 described below.

Refer now to FIGS. 2-6 which show the mower assembly 10 in greater detail. The mower assembly includes a mower head having a frame or chassis which includes a first or inner frame section 102 and a second or outer frame section 104. The mower head is mountable to boom 14 by means of a mower mounting bracket 106 which extends upwardly from inner frame section 102. Mounting bracket 106 connects the mower head to the boom using a mower head pivot connection pin 107 at its upper end. This pivot connection couples to the second lower end 30 of second boom member 22, such as at the lower end 30. The pivotal connection allows angular motion of mower assembly 10 relative to second boom member 22 about a horizontal axis which is generally parallel to boom pivots 46 and 32, and also to the mowing path. The axes of pivots 107, 46 and 32 are generally perpendicular to the lateral axis of boom 14.

Mower assembly 10 also includes a mower head tilt pivot linkage 108 which extends between second boom member 22 and the mower head. Pivot linkage 108 includes an upper, L-shaped link 110 which is pivotally connected to a lower link 112. Upper link 110 is pivotally connected to second boom member 22 near lower end 30 of boom member 22. The first section of the upper link extends generally outward from second boom member 22 to an elbow 114. A second section 1106 extends generally downward from elbow 114 along the boom to join with lower link 112. Upper and lower links 110 and 112 are pivotally connected at their intersection by pivot pin 113. Lower link 112 extends between pivot 113 and a tilt action pivot connection 115 on the mower head. As shown pivot 115 is connected to the mower mounting bracket 106 approximately midway between pivotal connection 107 and inner frame section 102.

A remotely-controlled power tilt actuator 116, preferably a double-acting hydraulic cylinder, is connected between second boom member 22 and upper link 110. This is preferably done at one cylinder end to elbow 114 and at the other cylinder end to an actuator coupling 118 positioned along second boom member 22. An operator control such as a hydraulic valve is located within the cab of tractor 12 to allow controlled extension and retraction of hydraulic cylinder 116. The operable connection of hydraulic cylinder 116 between second boom member 22 and inner mower frame section 102 allows an operator to control the angular tilt orientation of mower assembly 10.

Figure 4:
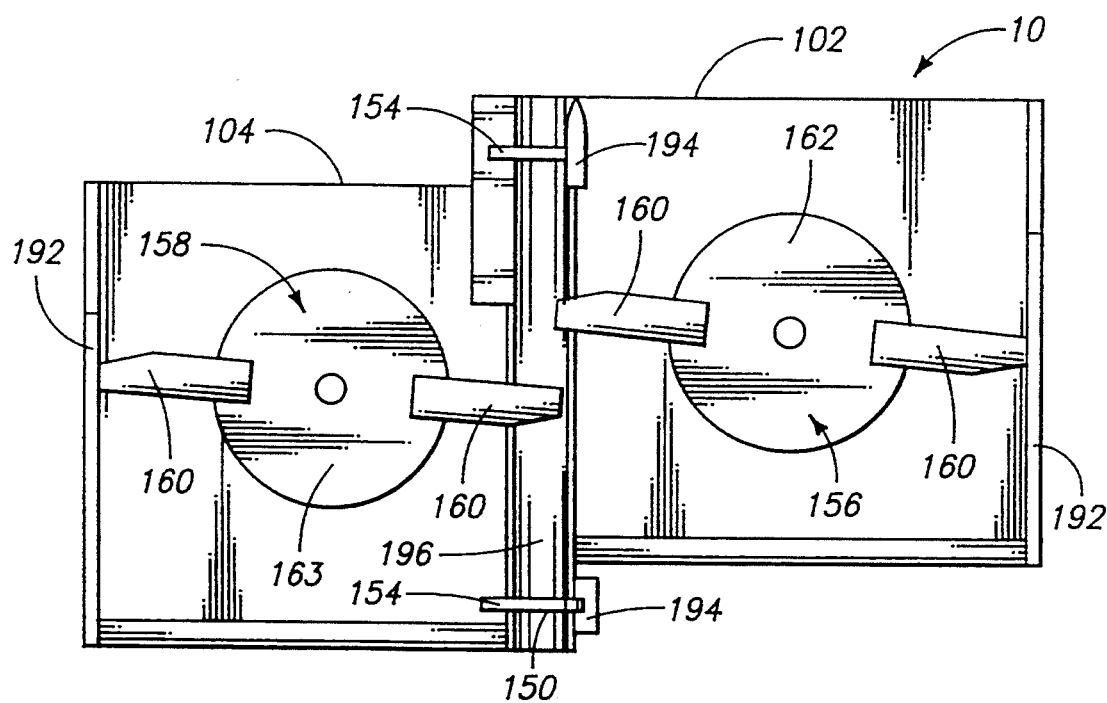
FIG. 4 is an enlarged bottom view of the mower assembly of FIG. 2.

Inner and outer mower sections 102 and 104 are connected to each other to allow relative angular motion therebetween. This is preferably done using two pivot joints 150 which connect frame sections 102 and 104 to each other while allowing for relative angular movement about a mower sections pivot axis. The mower sections pivot axis is generally horizontal and perpendicular to the lateral axis of boom 14. Each pivot joint 150 comprises an inner pivot arm 152 which extends from inner frame section 102 and an outer pivot arm 154 which extends from outer frame section 104. Pivot arms 152 and 154 extend toward each other to intersect and define the mower sections pivot axis. One of pivot joints 150 is positioned near the forward edge of the mower frame and the other one of pivot joints 150 is positioned near the rearward edge of the mower frame. As shown in FIG. 4, the two frame sections are offset from each other front-to-back in the mowing path direction so that the inner frame section leads the outer frame section as the tractor and mower assembly travel forward.

The mower head further includes first and second mower heads or blades 156 and 158 which are mounted for rotation beneath inner and outer frame sections 102 and 104, respectively. In the preferred embodiment, mower blades 156 and 158 are radial-type blades, having at least one, and preferably two, cutting knives or arms 160 which extend outwardly from central mower blade rotational axes. Each blade defines an associated cutting line or plane. The mower blade cutting planes determine the mowed height. Since the mower blades are mounted to the frame sections, the angular relationship of the cutting lines or planes varies with the angular relationship between inner and outer frame sections. In the most preferred embodiment, mower blades 156 and 158 are mounted relative to each other and to frame sections 102 and 104 so that their cutting lines or planes approximately coincide when their respective rotational axes are parallel. In addition, mower blades 156 and 158 are mounted so that their cutting lines or planes approximately intersect along the mower sections pivot axis. This ensures that the cutting heights of the adjacent mower blades remain approximately constant throughout the range of relative angular movement between inner and outer frame sections 102 and 104.

In the preferred embodiment shown, the cutting arms 160 of mower blades 156 and 158 are mounted to first and second rotor plates or flywheels 162 and 163, which are in turn driven by hydraulic motors 164 and 165. Drive shafts extend through the corresponding frame sections from each hydraulic motor to rotate the corresponding rotor plate.

The lateral spacing or clearance between cutter arms 160 of adjacent mower blades 156 and 158 is minimal, to reduce unmown gaps between the blades along the mower path. Because of the relative front-to-back offset between the inner and outer mower sections, the mower heads are also offset from each other front-to-back in the mowing path direction. This allows the blades to also be moved slightly toward each other without interference to produce a cutting overlap across the mowing path. The cutting overlap is preferably at least two inches.

A remotely-controlled power actuator 170 is operably connected between frame sections 102 and 104 to pivot the frame sections relative to each other and define a mower sections relative angular orientation. Mower assembly 10 thus includes means for allowing a human operator to control the relative angular positions of the first and second frame sections. Remotely-controlled power actuator 170 comprises a double-acting hydraulic cylinder connected to the mower frame to allow a human operator to control the relative angular position of the frame sections while mowing. Mower sections actuator 170 is connected at one of its ends to an actuator bracket 172 positioned towards an inner side of inner frame section 102. Hydraulic cylinder 170 extends laterally across inner frame section 102 and is connected at its other end to an interconnecting linkage assembly 174. Interconnecting linkage assembly 174 comprises an elongated link member 176 having an intermediate arm 178 which extends from an intermediate position along link member 176 at an approximate right angle. Link member 176 has a lower end which is pivotally connected to a link member mounting bracket 180 extending from inner frame section 102.

Link member 176 extends upwardly and outwardly from link member mounting bracket 180 and is pivotally connected at its upper end to an outer section link or bar 184. Intermediate arm 178 extends upwardly and inwardly toward hydraulic cylinder 170, and is pivotally connected thereto. Bar 184 extends laterally outward from the upper end of link member 176 and is pivotally connected to a mounting bracket 186 extending upward from outer frame section 104. Linkage assembly 174 amplifies the effect of hydraulic cylinder 170 so that approximately 110 degrees of relative angular motion can be achieved between frame sections 102 and 104 with a relatively short cylinder stroke. Cylinder 170 is double acting to positively move frame sections 102 and 104 in opposite angular directions in relation to each other and in response to operator control. Remote operator controls, such as a hydraulic valve lever, are provided in the cab of tractor 12 to allow a human operator to control and adjust the relative angular positions of the frame sections while mowing.

Mower assembly 10 also includes a suitable housing. As shown, the housing includes sidewalls 190 which extend downward from the sides and rear of the mower frame to partially surround the mower blades and to prevent flying debris. The forward edges of the respective mower frame sections 102 and 104 are preferably left open to allow unobstructed entry of grass and other vegetation into the cutting area beneath the blades. Skids 192 are optionally formed along lower edges of sidewalls 190 at an elevation below the cutting planes for contacting ground and for preventing the mower blades from contacting ground. The front portions 193 of skids 192 are preferably inclined. Center skids 194 are also advantageously included and positioned beneath pivot joints 150 for the same purpose. The front center skid is pointed to divert grass and vegetation around the skid rather than beneath it.

A flexible intersection shield 196 extends along the length of mower assembly 10, between frame sections 102 and 104. Shield 196 helps to prevent debris from flying upward between the frame sections. The flexible nature of the protective shield eliminates interference with the required relative motion between the frame sections.

The mower apparatus described above is made from components in accordance with generally known techniques to form the structures described herein. The preferred material of construction is steel. The hydraulic components and controls can be commercially-available products of the desired size and capability. Many tractors to which the mower assembly will be mounted include hydraulic reservoirs, pumps, and cab controls which can be connected to operate the hydraulic systems described above.

The invention is used in the manner indicated herein above. Mower boom 14 is usually swung into a position extending laterally from tractor 12 and over a roadside path which is to be mown. During mowing, it is frequently necessary to adjust both the lateral and vertical placement of the mower head to accommodate varying roadside conditions. Vertical elevation of the mower head is controlled by hydraulic cylinder 38, which varies the incline of boom member 20. Lateral position of the mower head is controlled by hydraulic cylinder 50 which pivots second boom member 22 relative to the outer end of first boom member 20.

In addition to controlling lateral and vertical placement of the mower head, an operator also controls and adjusts the angular tilt of each frame section. Such adjustment is accomplished by varying both the overall tilt orientation of the frame sections and the relative angle between the frame sections. Relative angular orientation between the two frame sections is adjusted by extending or retracting hydraulic cylinder 170. Tilt orientation of the overall mower is adjusted by extending or retracting hydraulic cylinder 116. The overall tilt orientation conveniently does not affect the relative orientation between the frame sections.

Figure 5:
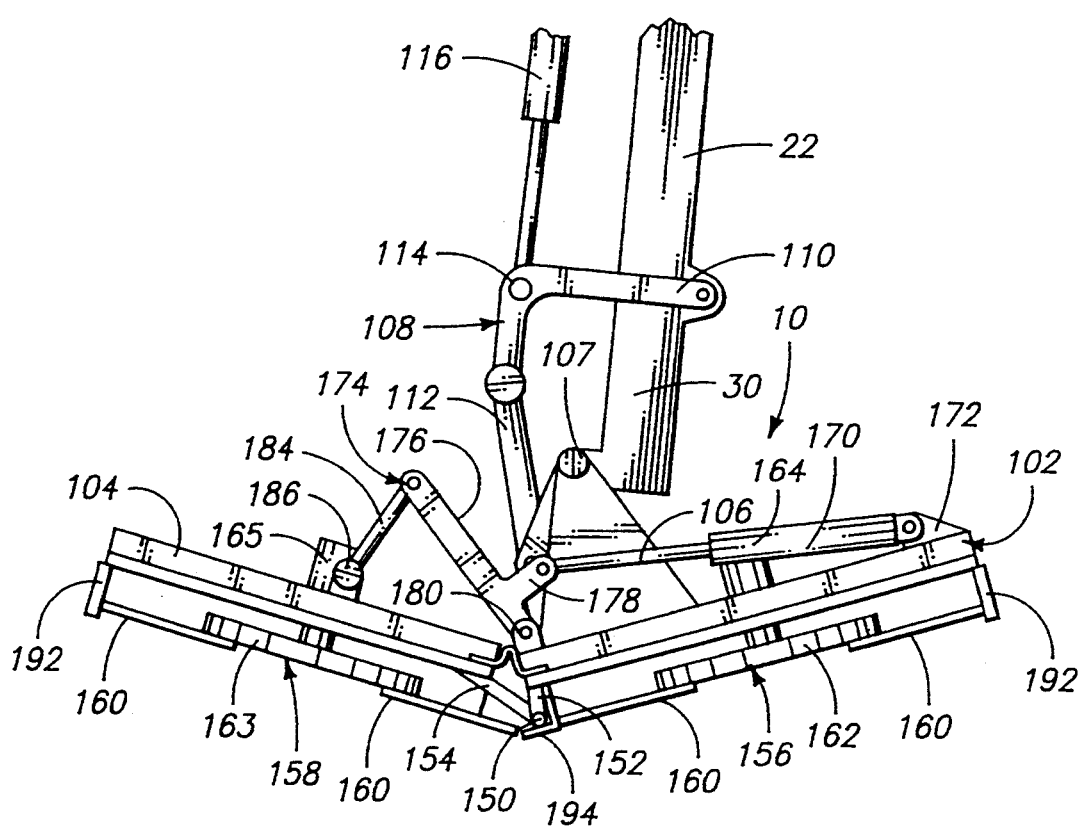
FIG. 5 is an enlarged partial front view similar to FIG. 2. The frame sections are shown in a different second relative angular position.

Mowing operations are simplified by the particular arrangement of the mower frame sections, as well as by the specific mounting arrangement of mower assembly 10 to tractor 12. The invention is particularly advantageous in simultaneously mowing both faces of a V-shaped ditch. FIGS. 5 and 6 show mower assembly 10 with its frame sections pivoted in two different positions relative to each other. These figures show only two of the many possible relative angular orientations between the mower sections. In actual operation, it is possible to orient the mower sections to conform to a great variety of roadside contours, as well as to adjust the overall tilt of the mower assembly.

In compliance with the statute, the invention has been described in language more or less specific as to structural features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A dual-blade mower assembly for mounting upon a boom, comprising:
   a mower frame mountable to the boom; said mower frame having at least a first frame section and a second frame section; said first and second frame sections being connected to allow relative angular motion between said frame sections;
   a first mower blade mounted on said first frame section;
   a second mower blade mounted on said second frame section; and
   at least a first remotely-controlled power actuator operably connected to the mower frame, the first remotely-controlled power actuator being controllable remotely from the mower frame to allow a human operator to control the relative angular positions of the first and second frame sections while mowing.

2. A dual-blade mower assembly according to claim 1 wherein the first power actuator is double-acting to move the first and second frame sections in opposite relative angular directions.

3. A dual-blade mower assembly according to claim 1 wherein the first power actuator is a double-acting hydraulic cylinder.

4. A dual-blade mower assembly according to claim 1 wherein the first and second frame sections are pivotally connected about a pivot axis.

5. A dual-blade mower assembly according to claim 1 wherein the first and second frame sections are pivotally connected about a pivot axis, each mower blade defining a cutting line which approximately intersects said pivot axis.

6. A dual-blade mower assembly according to claim 1 wherein:
   the first and second frame sections are pivotally connected about a pivot axis;
   each of said mower blades having at least one cutting arm which extends outwardly from a rotational axis and defines a cutting plane; said cutting plane approximately intersecting said pivot axis between the first and second frame sections.

7. A dual-blade mower assembly according to claim 1 and further comprising at least one skid connected to the mower frame for contacting the ground.

8. A dual-blade mower assembly according to claim 1 wherein the first power actuator is operably connected between the first and second frame sections to pivot the frame sections relative to each other.

9. A dual-blade mower assembly according to claim 1 and further comprising a second remotely-controlled power actuator operably connectable between the boom and one of the frame sections.

10. A dual-blade mower assembly according to claim 1 wherein:
    the first power actuator is operably connected between the first and second frame sections to pivot the frame sections relative to each other; and
    the dual-blade mower assembly further comprising a second remotely-controlled power actuator operably connectable between the boom and one of the frame sections.

11. A dual-blade mower assembly for mounting upon a mobile vehicle, comprising:
    a mower boom for connection to the mobile vehicle, the mower boom extending laterally from the mobile vehicle when connected thereto;
    a mower frame suspended from the boom; said mower frame having at least a first frame section and a second frame section; said first and second frame sections being connected to allow relative angular motion between said frame sections;
    a first mower blade mounted on said first frame section;
    a second mower blade mounted on said second frame section; and at least a first remotely-controlled power actuator operably connected to the mower frame, the first remotely-controlled power actuator being controllable from the mobile vehicle remotely from the mower frame to allow a human operator to control the relative angular positions of the first and second frame sections while mowing.

12. A dual-blade mower assembly according to claim 11 wherein the first power actuator is double-acting to move the first and second frame sections in opposite relative angular directions.

13. A dual-blade mower assembly according to claim 11 wherein the first power actuator is a double-acting hydraulic cylinder.

14. A dual-blade mower assembly according to claim 11 wherein the first and second frame sections are pivotally connected about a pivot axis.

15. A dual-blade mower assembly according to claim 11 wherein the first and second frame sections are pivotally connected about a pivot axis, each mower blade defining a cutting line which approximately intersects said pivot axis.

16. A dual-blade mower assembly according to claim 11 wherein:
the first and second frame sections are pivotally connected about a pivot axis;
each of said mower blades having at least one cutting arm which extends outwardly from a rotational axis and defines a cutting plane; said cutting plane approximately intersecting said pivot axis between the first and second frame sections.

17. A dual-blade mower assembly according to claim 11 and further comprising at least one skid connected to the mower frame for contacting the ground.

18. A dual-blade mower assembly according to claim 11 wherein the first power actuator is operably connected between the first and second frame sections to pivot the frame sections relative to each other.

19. A dual-blade mower assembly according to claim 11 and further comprising a second remotely-controlled power actuator operably connectable between the boom and one of the frame sections.

20. A dual-blade mower assembly according to claim 11 wherein:
the first power actuator is operably connected between the first and second frame sections to pivot the frame sections relative to each other; and
the dual-blade mower assembly further comprising a second remotely-controlled power actuator operably connectable between the boom and one of the frame sections.

21. A dual-blade mower assembly according to claim 11 wherein the mower boom comprises at least two articulated boom members.

22. A dual-blade mower assembly according to claim 11 wherein the mower boom comprises:
a first boom member for pivotal connection to the mobile vehicle;
a second boom member pivotally connected to the first boom member, the second boom member extending from the first boom member to the mower frame;
a first remotely-controlled boom actuator operably connected to the first boom member to allow a human operator to controllably pivot the first boom member while mowing; and
a second remotely-controlled boom actuator operably connected between the first and second boom members to allow a human operator to controllably pivot the second boom member relative to the first boom member while mowing.

23. A dual-blade mower assembly according to claim 11 wherein the mower boom comprises:
a first boom member for pivotal connection to the mobile vehicle;
a second boom member pivotally connected to the first boom member, the second boom member extending from the first boom member to the mower frame;
a first remotely-controlled boom actuator operably connected to the first boom member to controllably pivot the first boom member;
a second remotely-controlled boom actuator operably connected between the first and second boom members to controllably pivot the first and second boom members relative to each other; and
a second remotely-controlled power actuator operably connectable between the second boom member and one of the frame sections.

24. A mobile mower apparatus comprising:
a mobile vehicle;
a mower boom pivotally connected to the mobile vehicle, the mower boom extending laterally from the front of the mobile vehicle;
a mower frame suspended from the boom; said mower frame having at least a first frame section and a second frame section; said first and second frame sections being connected to allow relative angular motion between said frame sections;
a first mower blade mounted on said first frame section;
a second mower blade mounted on said second frame section;
the mobile vehicle having a remote operator control located remotely from the mower frame;
at least a first remotely-controlled power actuator operably connected to the mower frame, the first remotely-controlled power actuator being responsive to the remote operator control to allow a human operator to control the relative angular positions of the first and second frame sections while mowing.

25. A mobile mower apparatus according to claim 24 wherein the first power actuator is double-acting to move the first and second frame sections in opposite relative angular directions.

26. A mobile mower apparatus according to claim 24 wherein the first power actuator is a double-acting hydraulic cylinder.

27. A mobile mower apparatus according to claim 24 wherein the first and second frame sections are pivotally connected about a pivot axis.

28. A mobile mower apparatus according to claim 24 wherein the first and second frame sections are pivotally connected about a pivot axis, each mower blade defining a cutting line which approximately intersects said pivot axis.

29. A mobile mower apparatus according to claim 24 wherein:
the first and second frame sections are pivotally connected about a pivot axis;
each of said mower blades having at least one cutting arm which extends outwardly from a rotational axis and defines a cutting plane; said cutting plane approximately intersecting said pivot axis between the first and second frame sections.

30. A mobile mower apparatus according to claim 24 and further comprising at least one skid connected to the mower frame for contacting the ground.

31. A mobile mower apparatus according to claim 24 wherein the first power actuator is operably connected between the first and second frame sections to pivot the frame sections relative to each other.

32. A mobile mower apparatus according to claim 24 and further comprising a second remotely-controlled power actuator operably connectable between the boom and one of the frame sections.

33. A mobile mower apparatus according to claim 24 wherein:
the first power actuator is operably connected between the first and second frame sections to pivot the frame sections relative to each other; and the dual-blade mower assembly further comprising a second remotely-controlled power actuator operably connectable between the boom and one of the frame sections.

34. A mobile mower apparatus according to claim 24 wherein the mower boom comprises at least two articulated boom members.

35. A mobile mower apparatus according to claim 24 wherein the mower boom comprises:
- a first boom member for pivotal connection to the mobile vehicle;
- a second boom member pivotally connected to the first boom member, the second boom member extending from the first boom member to the mower frame;
- a first remotely-controlled boom actuator operably connected to the first boom member to allow a human operator to controllably pivot the first boom member while mowing; and
- a second remotely-controlled boom actuator operably connected between the first and second boom members to allow a human operator to controllably pivot the second boom member relative to the first boom member while mowing.

* * * * *